United States Patent
Lauritano et al.

(10) Patent No.: US 11,255,241 B1
(45) Date of Patent: Feb. 22, 2022

(54) SYSTEMS AND METHODS FOR SELECTIVE CATALYTIC REDUCTION (SCR) FAILURE DETECTION

(71) Applicant: GM GLOBAL TECHNOLOGY OPERATIONS LLC, Detroit, MI (US)

(72) Inventors: Luca Lauritano, Turin (IT); Michele Rosmarino, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 2 days.

(21) Appl. No.: 17/069,252

(22) Filed: Oct. 13, 2020

(51) Int. Cl.
*F01N 3/20* (2006.01)
*F01N 11/00* (2006.01)

(52) U.S. Cl.
CPC .......... *F01N 3/2066* (2013.01); *F01N 11/002* (2013.01); *F01N 2550/05* (2013.01); *F01N 2560/026* (2013.01); *F01N 2560/06* (2013.01); *F01N 2610/02* (2013.01); *F01N 2900/1404* (2013.01); *F01N 2900/1411* (2013.01); *F01N 2900/1814* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,054,735 | B2* | 5/2006 | Masuda | F02D 35/027 701/111 |
| 8,635,030 | B2* | 1/2014 | Zanetti | F02D 41/146 702/23 |
| 10,378,463 | B2* | 8/2019 | Quigley | F02D 41/1441 |
| 2011/0005203 | A1* | 1/2011 | Gady | B01D 53/9418 60/276 |
| 2011/0185707 | A1* | 8/2011 | Upadhyay | F01N 3/18 60/274 |
| 2013/0232958 | A1* | 9/2013 | Ancimer | B01D 53/9418 60/301 |
| 2013/0255233 | A1* | 10/2013 | Yasui | F01N 3/10 60/286 |
| 2017/0022865 | A1* | 1/2017 | Khaled | F02D 41/1462 |

* cited by examiner

*Primary Examiner* — Binh Q Tran
(74) *Attorney, Agent, or Firm* — Lorenz and Kopf LLP (57) ABSTRACT

Selective catalytic reaction (SCR) failure detection systems and methods for propulsion systems. The method includes obtaining (a) an upstream (of the SCR unit) $NO_x$ concentration value, and (b) a downstream $NO_x$ concentration value, and caching (a) and (b). The obtaining and caching is repeated until N cached values are obtained, where N is a preprogrammed number. Using the N cached values, an upstream average of $NO_x$, an upstream standard deviation, a downstream average of $NO_x$, and a downstream standard deviation are calculated. The calculated values are input for a failure detection algorithm pertaining to nitrogen oxides ($NO_x$) that generates a linear correlation factor. A best performing unacceptable (BPU) part is detected when the linear correlation factor is greater than a preprogrammed fail threshold.

20 Claims, 3 Drawing Sheets

SYSTEMS AND METHODS FOR SELECTIVE CATALYTIC REDUCTION (SCR) FAILURE DETECTION

INTRODUCTION

The present disclosure generally relates to mobile platforms, and more particularly relates to detecting selective catalytic reduction (SCR) failures as a function of nitrogen oxide values.

Some mobile platforms, such as, certain diesel-fuel vehicles, utilize a selective catalytic reduction (SCR) unit that is coupled, directly or indirectly, to an engine of the vehicle to reduce nitrogen oxides in the exhaust. The SCR units generally convert nitrogen oxides (also commonly referred to as $NO_x$) to nitrogen and water, with the assistance of a solution having ammonia or urea ($NH_3$). The amount of $NH_3$ that is injected is related to a sensed/detected amount of $NO_x$. When a SCR fails, its malfunction is apparent in it not converting nitrogen oxides to nitrogen and water; therefore, in an unacceptable or failing SCR, the sensed/detected upstream NO (as used herein, "upstream" is exhaust airflow measured after the engine and prior to the SCR for treatment) and sensed/detected downstream NO (as used herein "downstream" is exhaust airflow measured after the SCR treatment) are almost the same.

Accordingly, many available SCR failure detection solutions utilize an upstream $NO_x$ sensor and a downstream NO sensor and identify a failure by determining a SCR NO conversion efficiency using the sensed data between the upstream NO sensor and the downstream $NO_x$ sensor. However, a technical problem is presented when the NO sensors degrade (and their sensed data are affected by gain and/or offset), causing incorrect determinations of SCR $NO_x$ conversion efficiency. This technical problem is further magnified because some state regulatory agencies are requiring there to be no gap between a best performing unacceptable (BPU) SCR and a BPU NO sensor, that is, to exclude the gap between $NO_x$ sensors detection capability and SCR monitor sensitivity.

The following disclosure provides a technical solution to the above technical problem, in addition to addressing related issues. Furthermore, other desirable features and characteristics of the system and method will become apparent from the subsequent detailed description and the appended claims, taken in conjunction with the accompanying drawings and the preceding background.

SUMMARY

An embodiment of a failure detection system for a propulsion system having a selective catalytic reduction (SCR) unit is provided. The embodiment includes: a memory configured to store a failure detection algorithm pertaining to nitrogen oxides ($NO_x$) in the propulsion system; and a processor operationally coupled to the memory and programmed to: obtain (a) a first $NO_x$ concentration value pertaining to an upstream entrance of the SCR unit, and (b) a second $NO_x$ concentration value pertaining to a downstream exit of the SCR unit; cache (a) and (b), responsive to obtaining (a) and (b) and repeat obtaining and caching until N cached values are obtained, where N is a preprogrammed number; calculate, using the N cached values, an upstream average of $NO_x$, and an upstream standard deviation; calculate, using the N cached values, a downstream average of $NO_x$, and a downstream standard deviation; use the upstream average of $NO_x$, the upstream standard deviation, the downstream average of $NO_x$, and the downstream standard deviation as input for the failure detection algorithm pertaining to nitrogen oxides ($NO_x$) in the propulsion system, to generate therefrom a linear correlation factor; and detect a best performing unacceptable (BPU) part when the linear correlation factor is greater than a preprogrammed fail threshold.

In an embodiment, the processor is further programmed to supply a malfunction alert to a central platform controller responsive to detecting a BPU part.

In an embodiment, the failure detection algorithm includes rules for generating a Pearson's correlation.

In an embodiment, the preprogrammed fail threshold is between 0.75 and 0.85.

In an embodiment, the processor is further programmed to: obtain, in addition to (a), and (b): (c) an upstream mass flow value, (d) an upstream temperature value, (e) a downstream mass flow value, and, (e) a downstream temperature value; and cache (a), (b), (c), (d), (e), and (f), responsive to obtaining (a), (b), (c), (d), (e), and (f); and wherein each of the N cached values include a respective (a), (b), (c), (d), (e), and (f).

In an embodiment, the processor is further programmed to: process the N cached values to determine whether the temperature values are within an acceptable temperature range; process the N cached values to determine whether the mass flow values are within an acceptable mass flow range; and process the N cached values to determine whether the urea values are within an acceptable urea range.

In an embodiment, the processor is further programmed to discard all cached values and restart data collection, upon determining that the temperature values are not within an acceptable temperature range, the mass flow values are not within an acceptable mass flow range, or the urea values are not within an acceptable urea range.

Also provided is an embodiment of a propulsion system for a vehicle. The propulsion system includes: a selective catalytic reduction (SCR) unit having a upstream side and a downstream side; an upstream nitrogen oxides ($NO_x$) sensor providing an upstream $NO_x$ concentration value; a downstream nitrogen oxides ($NO_x$) sensor providing a downstream $NO_x$ concentration value; a source of urea coupled to the SCR unit and providing a urea value; and a control circuit comprising a processor programmed by programming instructions to: obtain (a) the upstream $NO_x$ concentration value, (b) the urea value, and (c) the downstream $NO_x$ concentration value; cache (a), (b) and (c), responsive to obtaining (a), (b) and (c); and repeat obtaining and caching until N cached values are obtained, where N is a preprogrammed number; calculate, using the N cached values, an upstream average of $NO_x$, and an upstream standard deviation; calculate, using the N cached values, a downstream average of $NO_x$, and a downstream standard deviation; use the upstream average of $NO_x$, the upstream standard deviation, the downstream average of $NO_x$, and the downstream standard deviation as input for a failure detection algorithm pertaining to nitrogen oxides ($NO_x$) in the propulsion system, to generate therefrom a linear correlation factor; and detect a best performing unacceptable (BPU) part when the linear correlation factor is greater than a preprogrammed fail threshold.

In an embodiment, the processor is further programmed to supply a malfunction alert to a central platform controller responsive to detecting a BPU part.

In an embodiment, the failure detection algorithm includes rules for generating a Pearson's correlation.

In an embodiment, the preprogrammed fail threshold is between 0.75 and 0.85.

In an embodiment, the processor is further programmed to: obtain, in addition to (a) and (b): (c) an upstream mass flow value, (d) an upstream temperature value, (e) a downstream mass flow value, (f) a downstream temperature value, and (g) a urea value; and cache (a), (b), (c), (d), (e), (f), and (g), responsive to obtaining (a), (b), (c), (d), (e), (f), and (g); and wherein each of the N cached values include a respective (a), (b), (c), (d), (e), (f) and (g).

In an embodiment, the processor is further programmed to: process the N cached values to determine whether the temperature values are within an acceptable temperature range; process the N cached values to determine whether the mass flow values are within an acceptable mass flow range; and process the N cached values to determine whether the urea values are within an acceptable urea range.

In an embodiment, the processor is further programmed to generate an alert for the central platform controller upon determining that the temperature values are not within an acceptable temperature range, the mass flow values are not within an acceptable mass flow range, or the urea values are not within an acceptable urea range.

In another embodiment, provided is a failure detection for a propulsion system having selective catalytic reduction (SCR) unit. The system includes: at a control circuit operationally coupled to the SCR unit, obtaining (a) a first $NO_x$ concentration value pertaining to an upstream entrance of the SCR unit, (b) a second $NO_x$ concentration value pertaining to a downstream exit of the SCR unit; caching (a), and (b), responsive to obtaining (a) and (b); and repeating the obtaining and caching until N cached values are obtained, where N is a preprogrammed number; calculating, using the N cached values, an upstream average of $NO_x$, and an upstream standard deviation; calculating, using the N cached values, a downstream average of $NO_x$, and a downstream standard deviation; using the upstream average of $NO_x$, the upstream standard deviation, the downstream average of $NO_x$, and the downstream standard deviation as input for a failure detection algorithm pertaining to nitrogen oxides ($NO_x$) in the propulsion system, to generate therefrom a linear correlation factor; and detecting a best performing unacceptable (BPU) part when the linear correlation factor is greater than a preprogrammed fail threshold.

In an embodiment, the failure detection algorithm includes rules for generating a Pearson's correlation.

In an embodiment, further supplying a malfunction alert to a central platform controller responsive to detecting a BPU part.

In an embodiment, further obtaining, in addition to (a) and (b): (c) an upstream mass flow value, (d) an upstream temperature value, (e) a downstream mass flow value, (f) a downstream temperature value, and, (g) a urea value from a urea storage unit coupled to the SCR unit; and caching (a), (b), (c), (d), (e), (f), and (g), responsive to obtaining (a), (b), (c), (d), (e), (f), and (g); and wherein each of the N cached values include a respective (a), (b), (c), (d), (e), (f), and (g).

In an embodiment, further processing the N cached values to determine whether the temperature values are within an acceptable temperature range; processing the N cached values to determine whether the mass flow values are within an acceptable mass flow range; and processing the N cached values to determine whether the urea values are within an acceptable urea range.

In an embodiment, further discarding all cached values and restarting data collection upon determining that the temperature values are not within an acceptable temperature range, the mass flow values are not within an acceptable mass flow range, or the urea values are not within an acceptable urea range.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As mentioned, when a SCR malfunctions, the sensed/detected upstream $NO_x$ and sensed/detected downstream $NO_x$ are almost the same. Accordingly, many available SCR failure detection solutions utilize an upstream $NO_x$ sensor and a downstream $NO_x$ sensor and identify a failure by determining the SCR $NO_x$ conversion efficiency using sensed data by upstream and downstream $NO_x$ sensors. However, a technical problem is presented when the $NO_x$ sensors degrade (and their sensed data are affected by gain and/or offset), causing incorrect determinations of SCR $NO_x$ conversion efficiency. This technical problem is further magnified because some state regulatory agencies are requiring there to be no gap between a best performing unacceptable (BPU) SCR and a BPU NO sensor, that is, to exclude the GAP between $NO_x$ sensors detection capability and SCR monitor sensitivity.

The technical solution provided by exemplary embodiments of the SCR failure detection system compares sensed/detected upstream NO and sensed/detected downstream NO to assess a linearity of their relationship, and is independent of any separate changes in location and scale (offset/gain) in the sensed upstream and downstream data. Exemplary embodiments can provide a technologically enhanced SCR malfunction alert by detecting a strength of a linear relationship between the sensed/detected upstream NO and sensed/detected downstream $NO_x$. In exemplary embodiments, the SCR malfunction alert can be supplied to other vehicle applications, such as a central platform controller, for use in practical applications, such as the illuminating malfunction lights, for example. The technologically enhanced SCR failure detection system and method are described in more detail in connection with the figures below.

Figure 1:
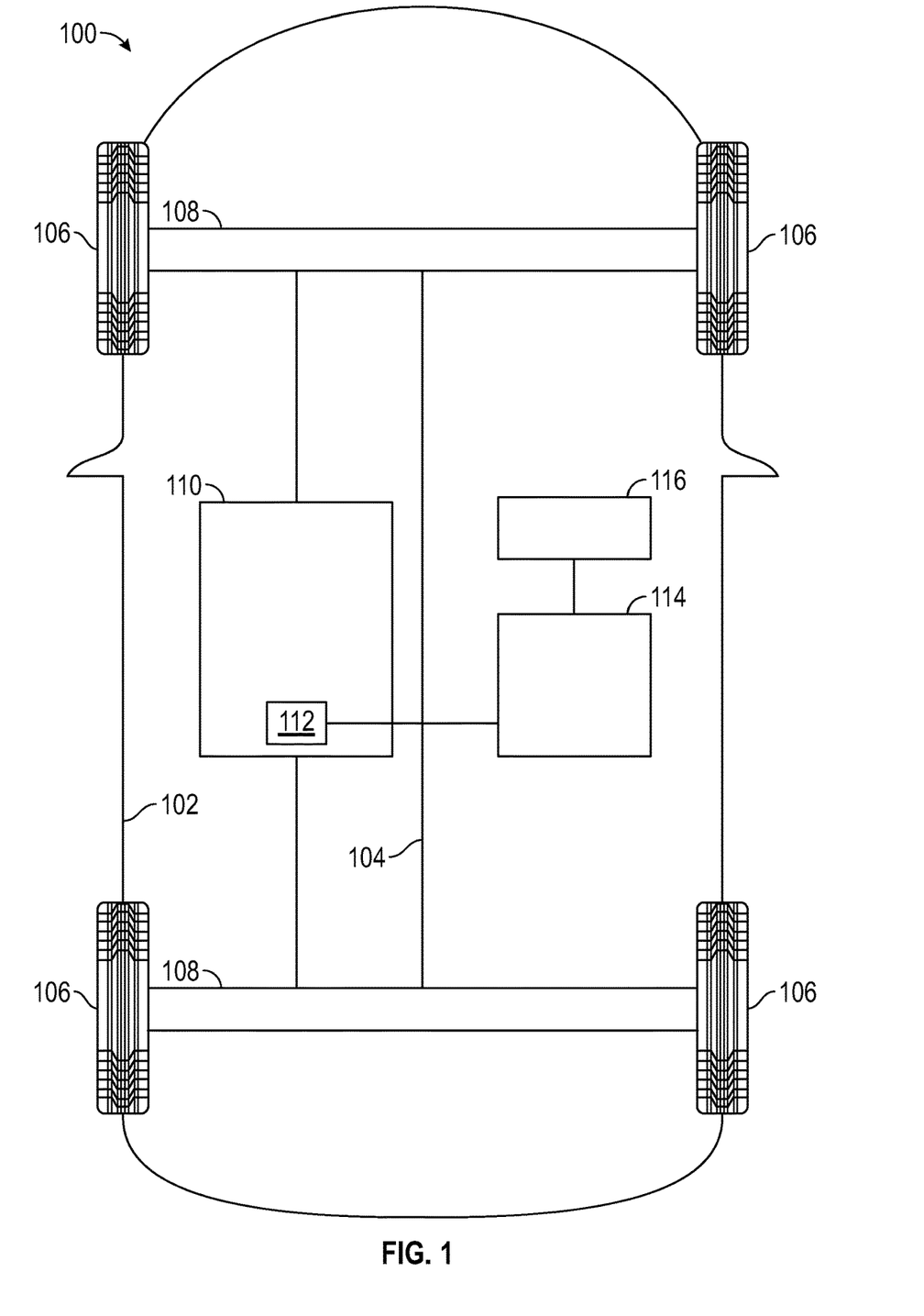
FIG. 1 is a functional block diagram illustrating a SCR failure detection system implemented onboard a vehicle, in accordance with various embodiments.

FIG. 1 depicts an example mobile platform, according to an exemplary embodiment. The mobile platform is a vehicle 100, and includes a body 102, a chassis 104, one or more wheels 106, one or more drive shafts (or axles) 108, and a propulsion system 110. In various embodiments the vehicle 100 comprises an automobile; however, this may vary in other embodiments. The vehicle 100 may be any one of a number of different types of automobiles and/or other vehicles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

The body 102 is arranged on the chassis 104 and substantially encloses the other components of the vehicle 100. The body 102 and the chassis 104 may jointly form a frame. The wheels 106 are each rotationally coupled to the chassis 104 near a respective corner of the body 102. In one embodiment, each wheel 106 comprises a wheel assembly that includes a tire as well as a wheel and related components (and that are also collectively referred to as the "wheel 106" for the purposes of this Application). The propulsion system 110 is coupled to at least some of the wheels 106 through one or more of the drive axles 108 and drives the wheels 106 via the axles 108. While the vehicle 100 is depicted in FIG. 1 as having four wheels 106 and two axles 108, it will be appreciated that in various other embodiments the vehicle 100 may have any number of wheels 106, axles 108, and/or other components.

As described in greater detail below, the propulsion system 110 includes at least one SCR unit and the SCR failure detection system, shown generally as system 112. The propulsion system 110 is communicatively coupled to the central platform controller 114 and dashboard 116.

The central platform controller 114 may receive and integrate communications from a variety of modules and systems known to be present in the above described vehicle 100. The central platform controller 114 may also be in bidirectional communication with onboard object recognition modules. The central platform controller 114 communicates user and operational input to the propulsion system 110 and other on-board systems. Accordingly, inputs provided by the central platform controller 114 to the system 112 may include user inputs, mobile applications and systems, off-board communications (e.g., via a transceiver), a geographic positioning system (GPS), and infotainment systems.

The dashboard 116 may include display units, user input devices, speakers, and the like. With respect to the present disclosure, the dashboard 116 may have one or more malfunction illumination lights (MILs) for communicating a malfunction alert to a user and associated technicians.

Figure 2:
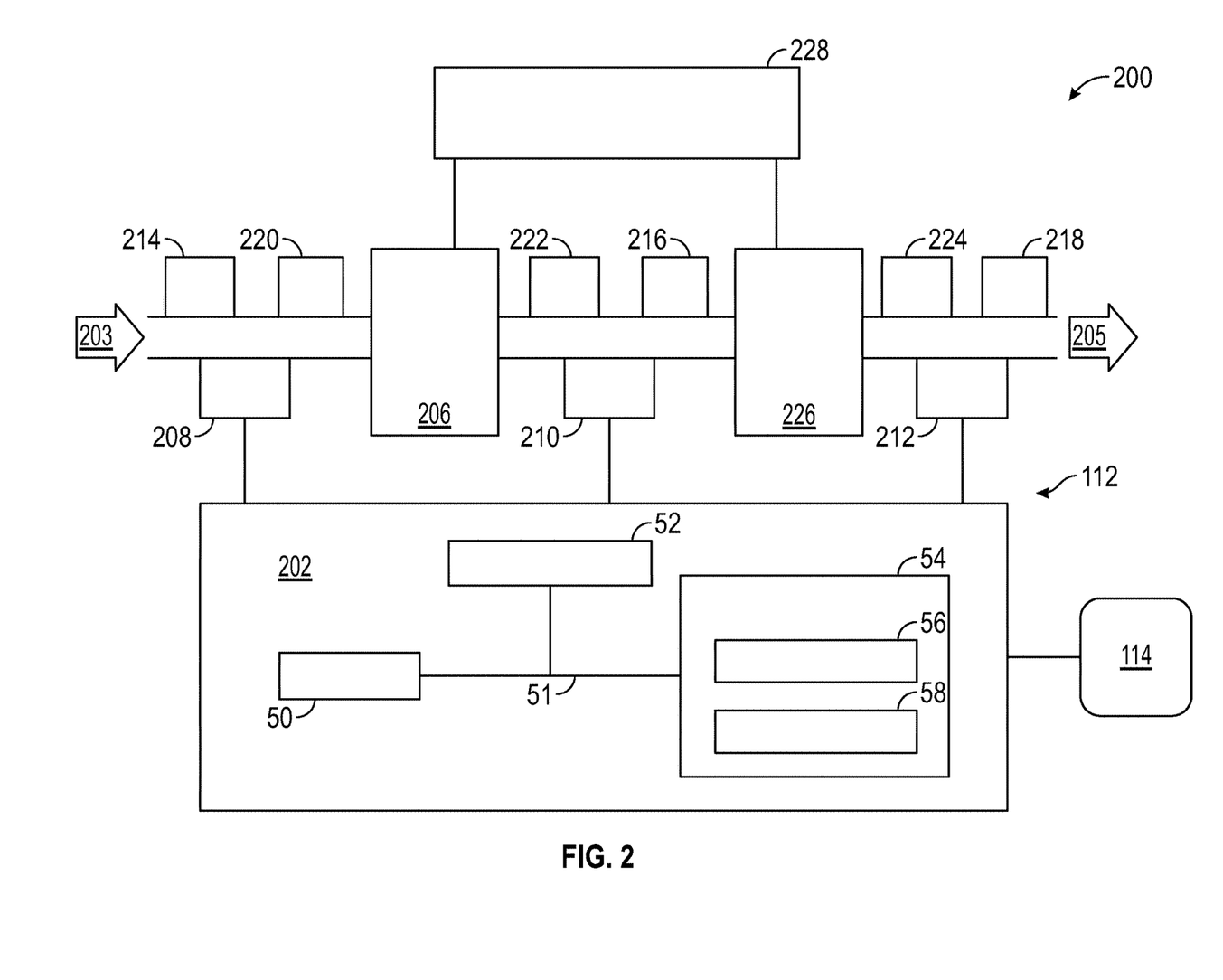
FIG. 2 is a functional block diagram of the SCR failure detection system, in accordance with various embodiments.

Turning now to FIG. 2, a portion 200 of the propulsion system 110 is depicted. The SCR failure detection system 112 is shown implemented as a control circuit 202 in operational communication with various sensors along an exhaust flow path, described as follows. On the left, upstream 203 represents exhaust flow that is after engine, but prior to the SCR. On the right, downstream 205 represents exhaust flow that is post SCR. Upstream 203 exhaust may be subjected to a first $NO_x$ sensor 208, a first mass flow sensor 214, and a first temperature sensor 220, on entrance to a first SCR unit 206 shown on the left. A urea or $NH_3$ storage and pump 228 is shown in operable communication with the first SCR unit 206. On the exit side of the first SCR unit 206, there may be a second $NO_x$ sensor 210, a second temperature sensor 222 and a second mass flow sensor 216. In some embodiments, the exhaust output from the first SCR unit 206 is the downstream 205 exhaust.

In some embodiments, an optional second SCR unit 226 is implemented, receiving as input the exhaust flow out of the first SCR unit 206. The urea or $NH_3$ storage and pump 228 is shown in operable communication with the optional second SCR unit 226. On the exit side of the optional second SCR unit 226, there may be a third $NO_x$ sensor 212, a third temperature sensor 224 and a third mass flow sensor 218. In some embodiments, the exhaust output from the second SCR unit 226 is the downstream 205 exhaust.

As used herein, the control circuit 202 facilitates communications and/or interaction between the components of the system 112 and performs additional processes, tasks and/or functions to support operations attributed to the system 112, as described herein.

The functional blocks described in connection with FIGS. 1-2, including the control circuit 202, may be implemented using any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the functionality attributed to the functional block.

In various embodiments, as shown in FIG. 2, the control circuit 202 is realized as an enhanced computer system, comprising a processor 50, computer readable storage device or media (memory 54) for storage of instructions, algorithms, and/or programs, such as program 56 and a plurality of preprogrammed thresholds and parameters 58, an interface 52, and a bus 51.

The processor 50 may execute the program 56. Depending on the embodiment, the processor 50 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

The program 56, stored in memory 54, when executed by the processor 50, may cause the processor 50 to implement the herein described tasks and functions, including implementing a failure detection algorithm to detect a best performing unacceptable (BPU) SCR unit. The memory 54 may also be utilized by the processor 50 to cache multiple sensed data points at a time, to store results of comparisons and analyses, and the like. Accordingly, the computer readable storage device or media, memory 54, may include volatile and nonvolatile storage in read-only memory (ROM), random-access memory (RAM), and keep-alive memory (KAM), for example. KAM is a persistent or non-volatile memory that may be used to store various operating parameters 58 while the processor 50 is powered down. The memory 54 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 50 in controlling the vehicle 100. Information in the memory 54 may be organized and/or imported from an external source during an initialization or installment operation in a method; it may also be programmed via a user input device.

The interface 52 supports bidirectional communication with the control circuit 202, for example from a system driver and/or another computer system and can be implemented using any suitable method and apparatus. The interface 52 includes the hardware and software to support one or more communication protocols for wired and/or wireless communication between the processor 50 and external sources, such as satellites, the cloud, communication towers and ground stations. In one embodiment, the interface 52 obtains the various data from the sensors of the propulsion system 110. The interface 52 may also include one or more network interfaces to communicate with technicians, and/or one or more storage interfaces to connect to storage apparatuses, such as the memory 54. Bus 51 serves to transmit programs, data, status and other information or signals between the various components of the enhanced computer system of the control circuit 202. The bus 51 can be any suitable physical or logical means of connecting computer systems and components, this includes, but is not limited to, direct hard-wired connections, fiber optics, infrared and wireless bus technologies.

In other embodiments of the system 112, the control circuit 202 may be implemented as state machine logic, and/or may perform operations in accordance with logic in a programmable logic array, or the like.

While the exemplary embodiment of the system 112 is described in the context of a fully functioning enhanced computer system, those skilled in the art will recognize that the mechanisms of the present disclosure are capable of being distributed as a program product including program 56 and the preprogrammed parameters 58. Such a program product may comprise one or more program code modules having an ordered listing of executable instructions for implementing logical functions, performing algorithmic operations, and managing data flow through the system 112. The instructions in the program code modules, when executed by a processor (e.g. processor 50), cause the processor to receive and process signals, and perform logic, calculations, methods and/or algorithms as described herein.

Once developed, the program code modules constituting a program product may be stored and distributed individually, or together, using one or more types of non-transitory computer-readable signal bearing media to store and distribute the instructions, such as a non-transitory computer readable medium. Such a program product may take a variety of forms, and the present disclosure applies equally regardless of the type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized as memory and as program product time-based viewing of clearance requests in certain embodiments.

Figure 3:
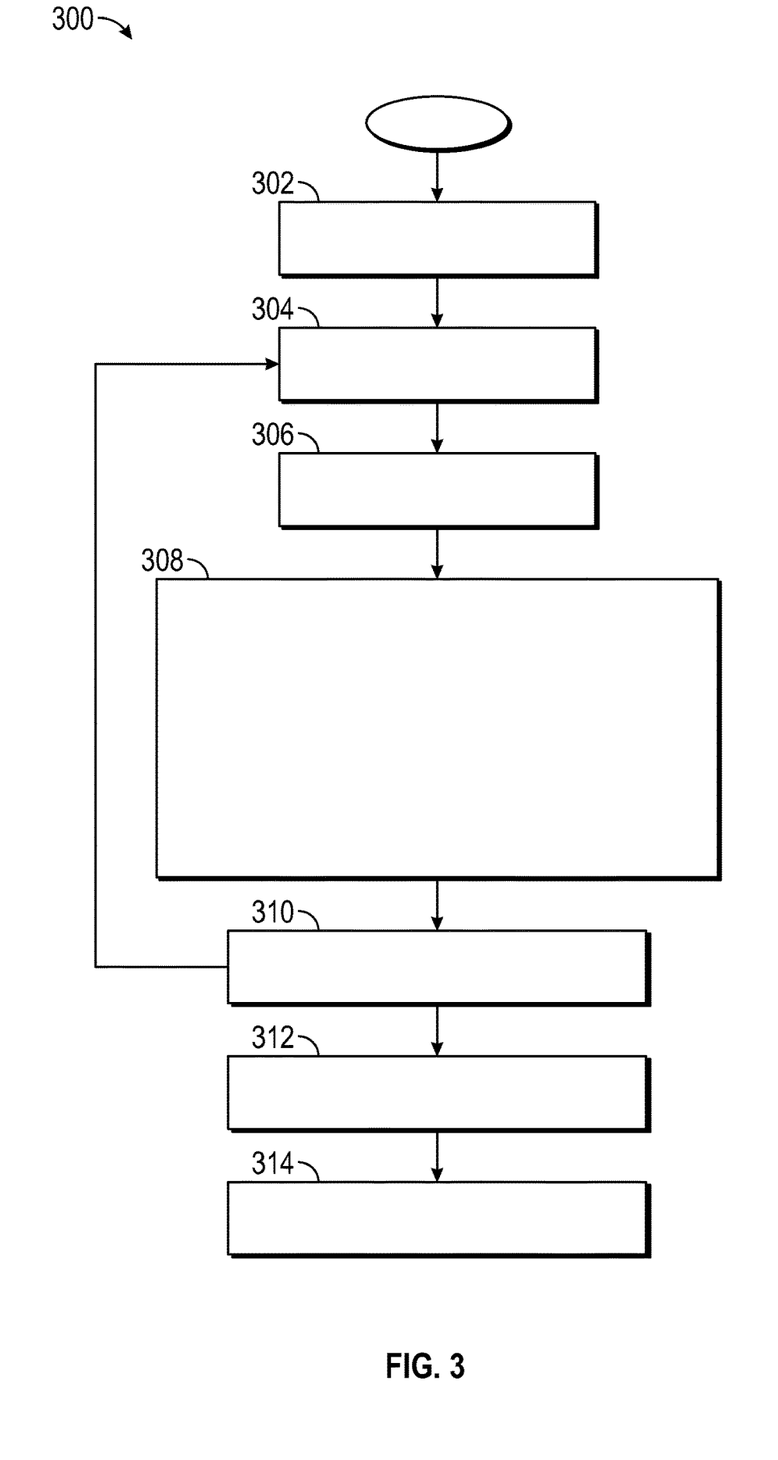
FIG. 3 is a process flow chart depicting an example method for SCR failure detection in a mobile platform, in accordance with various embodiments.

Turning now to FIG. 3, and with continued reference to FIGS. 1-2, in various embodiments, the steps of a processor-executable method 300 for SCR failure detection can be arranged in one or more program code modules. For illustrative purposes, the following description of method 300 may refer to elements mentioned above in connection with FIGS. 1-2. In practice, portions of method 300 may be performed by different components of the described system 112. It should be appreciated that method 300 may include any number of additional or alternative operations and tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 as long as the intended overall functionality remains intact.

At 302, the system 112 is initialized. When implemented as an enhanced computer system (e.g., FIG. 1), initialization at 302 may comprise uploading, installing, or updating the instructions constituting the program 56 and preprogrammed parameters 58 for execution by the processor 50. At initialization, a preprogrammed range may be identified for any combination of: (i) acceptable temperatures, (ii) acceptable mass flow (this is a volumetric measurement of exhaust airflow), and (iii) an acceptable amount of $NH_3$ in storage. The one or more preprogrammed ranges are assigned for the first SCR unit 206. In embodiments that employ the second SCR unit 226, a second one or more of the preprogrammed ranges are assigned for the second SCR unit 226. In various embodiments, the second one or more preprogrammed ranges are different than the first preprogrammed ranges. In various embodiments, the second one or more preprogrammed ranges are the same as the three preprogrammed ranges. At initialization, a cache size (N) is set, wherein N is a number of times to capture sequentially obtained sensed values. At initialization, an initial fail threshold (a number between 0 and 1) is also set.

At 304, the system 112 begins obtaining sensed data values. At 304, the system 112 may obtain (a) a first $NO_x$ concentration value, from the first $NO_x$ sensor 208, pertaining to an upstream 203 entrance of the first SCR unit 206, and (b) a second $NO_x$ concentration value, from the second $NO_x$ sensor 210, pertaining to a downstream 205 exit. In various embodiments, at 304, the system 112 may also obtain (c) a first mass flow value from mass flow sensor 214 (i.e., upstream), (d) a first temperature value from temperature sensor 220 (i.e., upstream), (e) a second mass flow value from mass flow sensor 216 (i.e. downstream), and, (f) a second temperature value from temperature sensor 222 (i.e. downstream). In various embodiments, at 304, the system 112 may also obtain and cache (g) a urea concentration value at each of the N collections. Obtaining these additional values allows for determinations about temperature drops through the SCR unit 206 and any variation in mass flow through the SCR unit 206.

In embodiments with a second SCR unit 226, the output from the first SCR unit 206 is the input into the second SCR unit 226, and the exit of the second SCR unit 226 is the downstream 205 exit. In these embodiments, at 304, the system 112 may obtain (h) a third $NO_x$ concentration value, from the third $NO_x$ sensor 212, pertaining to a downstream 205 exit of the second SCR unit 226. A second urea value is obtained for the second SCR unit 226, the second urea value is independent from urea storage value for the first SCR unit 206. In embodiments with a second SCR unit 226, at 304, the system 112 may also obtain (i) a third mass flow value from mass flow sensor 218, and (j) a third temperature value from temperature sensor 224.

At 306, the system 112 begins caching and caches (i.e., buffers or captures) at least N sequentially obtained sensed values for (a), and (b) Described differently, at each of the N captures, there may be at least two different sensed values: upstream $NO_x$, and downstream $NO_x$, this may be referred to as a data string of size 2, or as an association of two items at each of N points in the cache of size N. The output from 306 is collectively referred to as cached values. In various embodiments, each of the N cached values include a respective (a), (b), (c), (d), (e), and (f). In various embodiments, each of the N cached values include a respective (a), (b), (c), (d), (e), (f) and (g) In various embodiments, each of the N cached values include a respective (a), (b), (c), (d), (e), (g), (h), (i), and (j).

At 308, pre-processing of the cached values is performed. In various embodiments, pre-processing includes calculating, using the N cached values, an upstream average of $NO_x$), which may be referenced as X herein, and an upstream standard deviation of X (sigma-x). At 308, pre-processing also includes calculating, using the N cached values, a downstream average of $NO_x$, which may be referenced as Y herein, and a downstream standard deviation of Y (sigma-y).

In various embodiments, pre-processing includes confirming (by comparing the value to the preprogrammed range) that: temperature values are within the acceptable temperature range, mass flow values are within the acceptable mass flow range, and the urea values are within the acceptable urea range. In various embodiments, upon determining that any of the values are out of range, the system 112 will discard all the collected cached values and will restart data collection.

At 310, the processor may use the upstream average of $NO_x$, the upstream standard deviation, the downstream average of $NO_x$, and the downstream standard deviation as input for the failure detection algorithm pertaining to nitrogen oxides ($NO_x$) in the propulsion system, to generate therefrom a linear correlation factor (LCF). In various embodiments, the processing at 310 includes performing a Pearson's correlation, in which:

$$0<=LCF=abs((covariance(X,Y))/(sigma-x*sigma-y))**exp<=1;$$

Wherein "abs" represents taking the absolute value, and **exp represents raising the absolute value to the exponential power.

When the LCF is one, the relationship between the upstream $NO_x$ and downstream $NO_x$ is linear, and when the LCF is zero, the relationship between the upstream $NO_x$ and downstream $NO_x$ is non-linear. Acceptable SCR units exhibit a non-linear, or at best, weakly linear, relationship between the upstream $NO_x$ and the downstream upstream $NO_{x3}$. Programming the fail threshold to be closer to zero is a more conservative approach, you fail more weakly linear relationships, but can fail some worst performing acceptable (WPA) parts. Programming the fail threshold to be closer to one is a more generous approach, however, you can have the undesirable effect of passing some best performing unacceptable (BPU) parts. Therefore, at 310, the LCF is compared to the preprogrammed fail threshold. In various embodiments, the fail threshold is between 0.75 and 0.85. If the LCF is less than or equal to the fail threshold, the method 300 may cycle back to 304.

At 312, when the LCF is greater than the fail threshold, a BPU part has been detected. In various embodiments, the BPU part is the SCR unit 206. In various embodiments, responsive to detecting a BPU part, the method 300 also supplies a malfunction alert to the central platform controller 114. Using the malfunction alert, the central platform controller 114 may illuminate warning lights on the dashboard 116, and/or may transmit warnings or messages to personal electronic devices or service providers.

Thus, the provided system 112 and method 300 provide a technological solution to the technical problem of SCR failure detection. Embodiments provided are robust over varying offsets and gains of $NO_x$ sensors, which is a technological enhancement over available SCR failure detection strategies for propulsion systems. Use of these embodiments enable designers to achieve six sigma separation between BPU and WPA SCRs, regardless of $NO_x$ sensor failure mode While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

What is claimed is:

1. A failure detection system for a propulsion system having a selective catalytic reduction (SCR) unit, comprising:
   a memory configured to store a failure detection algorithm pertaining to nitrogen oxides ($NO_x$) in the propulsion system; and
   a processor operationally coupled to the memory and programmed to:
      obtain (a) a first $NO_x$ concentration value pertaining to an upstream entrance of the SCR unit, and (b) a second $NO_x$ concentration value pertaining to a downstream exit of the SCR unit;
      cache (a) and (b), responsive to obtaining (a) and (b) and
      repeat obtaining and caching until N cached values are obtained, where N is a preprogrammed number;
      calculate, using the N cached values, an upstream average of $NO_x$, and an upstream standard deviation;
      calculate, using the N cached values, a downstream average of $NO_x$, and a downstream standard deviation;
      use the upstream average of $NO_x$, the upstream standard deviation, the downstream average of $NO_x$, and the downstream standard deviation as input for the failure detection algorithm pertaining to nitrogen oxides ($NO_x$) in the propulsion system, to generate therefrom a linear correlation factor; and
      detect a best performing unacceptable (BPU) part when the linear correlation factor is greater than a preprogrammed fail threshold.

2. The failure detection system of claim 1, wherein the processor is further programmed to supply a malfunction alert to a central platform controller responsive to detecting a BPU part.

3. The failure detection system of claim 1, wherein the failure detection algorithm includes rules for generating a Pearson's correlation.

4. The failure detection system of claim 3, wherein the preprogrammed fail threshold is between 0.75 and 0.85.

5. The failure detection system of claim 3, wherein the processor is further programmed to:
obtain, in addition to (a) and (b): (c) an upstream mass flow value, (d) an upstream temperature value, (e) a downstream mass flow value, (f) a downstream temperature value, and (g) a urea value; and
cache (a), (b), (c), (d), (e), (f), and (g), responsive to obtaining (a), (b), (c), (d), (e), (f), and (g); and
wherein each of the N cached values include a respective (a), (b), (c), (d), (e), (f) and (g).

6. The failure detection system of claim 5, wherein the processor is further programmed to:
process the N cached values to determine whether the temperature values are within an acceptable temperature range;
process the N cached values to determine whether the mass flow values are within an acceptable mass flow range; and
process the N cached urea values to determine whether the urea values are within an acceptable urea range.

7. The failure detection system of claim 6, wherein the processor is further programmed to discard all cached values and restart data collection, upon determining that the temperature values are not within an acceptable temperature range, the mass flow values are not within an acceptable mass flow range, or the urea values are not within an acceptable urea range.

8. A propulsion system for a vehicle, comprising:
a selective catalytic reduction (SCR) unit having a upstream side and a downstream side;
an upstream nitrogen oxides ($NO_x$) sensor providing an upstream NO concentration value;
a downstream nitrogen oxides ($NO_x$) sensor providing a downstream NO concentration value;
a source of urea coupled to the SCR unit and providing a urea value; and
a control circuit comprising a processor programmed by programming instructions to:
obtain (a) the upstream NO concentration value and (b) the downstream $NO_x$ concentration value;
cache (a) and (b), responsive to obtaining (a) and (b); and
repeat obtaining and caching until N cached values are obtained, where N is a preprogrammed number;
calculate, using the N cached values, an upstream average of $NO_x$, and an upstream standard deviation;
calculate, using the N cached values, a downstream average of $NO_x$, and a downstream standard deviation;
use the upstream average of $NO_x$, the upstream standard deviation, the downstream average of $NO_x$, and the downstream standard deviation as input for a failure detection algorithm pertaining to nitrogen oxides ($NO_x$) in the propulsion system, to generate therefrom a linear correlation factor; and
detect a best performing unacceptable (BPU) part when the linear correlation factor is greater than a preprogrammed fail threshold.

9. The propulsion system of claim 8, wherein the processor is further programmed to supply a malfunction alert to a central platform controller responsive to detecting a BPU part.

10. The propulsion system of claim 8, wherein the failure detection algorithm includes rules for generating a Pearson's correlation.

11. The propulsion system of claim 10, wherein the preprogrammed fail threshold is between 0.75 and 0.85.

12. The propulsion system of claim 10, wherein the processor is further programmed to:
obtain, in addition to (a) and (b): (c) an upstream mass flow value, (d) an upstream temperature value, (e) a downstream mass flow value, (f) a downstream temperature value, and (g) a urea value; and
cache (a), (b), (c), (d), (e), (f), and (g), responsive to obtaining (a), (b), (c), (d), (e), (f), and (g); and
wherein each of the N cached values include a respective (a), (b), (c), (d), (e), (f) and (g).

13. The propulsion system of claim 12, wherein the processor is further programmed to:
process the N cached values to determine whether the temperature values are within an acceptable temperature range;
process the N cached values to determine whether the mass flow values are within an acceptable mass flow range; and
process the N cached values to determine whether the urea values are within an acceptable urea range.

14. The propulsion system of claim 13, wherein the processor is further programmed to generate an alert for the central platform controller upon determining that the temperature values are not within an acceptable temperature range, the mass flow values are not within an acceptable mass flow range, or the urea values are not within an acceptable urea range.

15. A method for failure detection for a propulsion system having selective catalytic reduction (SCR) unit, comprising:
at a control circuit operationally coupled to the SCR unit, obtaining (a) a first $NO_x$ concentration value pertaining to an upstream entrance of the SCR unit and (b) a second NO concentration value pertaining to a downstream exit of the SCR unit;
caching (a) and (b), responsive to obtaining (a) and (b); and
repeating the obtaining and caching until N cached values are obtained, where N is a preprogrammed number;
calculating, using the N cached values, an upstream average of $NO_x$, and an upstream standard deviation;
calculating, using the N cached values, a downstream average of $NO_x$, and a downstream standard deviation;
using the upstream average of $NO_x$, the upstream standard deviation, the downstream average of $NO_x$, and the downstream standard deviation as input for a failure detection algorithm pertaining to nitrogen oxides ($NO_x$) in the propulsion system, to generate therefrom a linear correlation factor; and
detecting a best performing unacceptable (BPU) part when the linear correlation factor is greater than a preprogrammed fail threshold.

16. The method of claim 15, wherein the failure detection algorithm includes rules for generating a Pearson's correlation.

17. The method of claim 16, further comprising, supplying a malfunction alert to a central platform controller responsive to detecting a BPU part.

18. The method of claim 15, further comprising:
obtaining, in addition to (a) and (b): (c) an upstream mass flow value, (d) an upstream temperature value, (e) a downstream mass flow value, (f) a downstream temperature value, and, (g) a urea value from a urea storage unit coupled to the SCR unit; and
caching (a), (b), (c), (d), (e), (f), and (g), responsive to obtaining (a), (b), (c), (d), (e), (f), and (g); and wherein each of the N cached values include a respective (a), (b), (c), (d), (e), (f), and (g).

19. The method of claim 18, further comprising:

processing the N cached values to determine whether the temperature values are within an acceptable temperature range;

processing the N cached values to determine whether the mass flow values are within an acceptable mass flow range; and processing the N cached values to determine whether the urea values are within an acceptable urea range.

20. The method of claim 18, further comprising discarding all cached values and restarting data collection upon determining that the temperature values are not within an acceptable temperature range, the mass flow values are not within an acceptable mass flow range, or the urea values are not within an acceptable urea range.

* * * * *